United States Patent
Koh et al.

(10) Patent No.: US 9,900,586 B2
(45) Date of Patent: Feb. 20, 2018

(54) 3 DIMENSIONAL IMAGE DISPLAY DEVICE

(71) Applicant: SAMSUNG DISPLAY CO., LTD., Yongin, Gyeonggi-Do (KR)

(72) Inventors: Jai-Hyun Koh, Seoul (KR); Bong-Hyun You, Yongin-si (KR); Jae-Sung Bae, Suwon-si (KR)

(73) Assignee: SAMSUNG DISPLAY CO., LTD., Yongin, Gyeonggi-do (KR)

( * ) Notice: Subject to any disclaimer, the term of this patent is extended or adjusted under 35 U.S.C. 154(b) by 586 days.

(21) Appl. No.: 14/153,214

(22) Filed: Jan. 13, 2014

(65) Prior Publication Data

US 2014/0160258 A1 Jun. 12, 2014

Related U.S. Application Data

(62) Division of application No. 13/088,695, filed on Apr. 18, 2011, now abandoned.

(30) Foreign Application Priority Data

Sep. 28, 2010 (KR) .................. 10-2010-0093704

(51) Int. Cl.
*H04N 13/04* (2006.01)
*H04N 1/60* (2006.01)

(52) U.S. Cl.
CPC .......... *H04N 13/04* (2013.01); *H04N 1/6005* (2013.01); *H04N 13/0438* (2013.01); *H04N 13/0497* (2013.01)

(58) Field of Classification Search
None
See application file for complete search history.

(56) References Cited

U.S. PATENT DOCUMENTS

| | | | |
|---|---|---|---|
| 6,396,469 B1 | 5/2002 | Miwa et al. | |
| 6,476,824 B1 * | 11/2002 | Suzuki | G09G 3/2055 345/690 |
| 6,836,293 B2 | 12/2004 | Itoh et al. | |
| 6,894,669 B2 | 5/2005 | Suzuki et al. | |
| 7,038,651 B2 | 5/2006 | Nitta et al. | |
| 7,161,576 B2 | 1/2007 | Kawabe et al. | |
| 7,256,836 B2 | 8/2007 | Itoh et al. | |
| 7,495,646 B2 | 2/2009 | Kawabe et al. | |
| 2002/0021832 A1 * | 2/2002 | Dawson | G02B 27/2207 382/154 |
| 2005/0030272 A1 | 2/2005 | Hosaka | |

(Continued)

FOREIGN PATENT DOCUMENTS

| | | |
|---|---|---|
| JP | 3776868 | 3/2006 |
| KR | 100787030 | 12/2007 |
| KR | 10-2010-0040688 | 4/2010 |

*Primary Examiner* — Dave Czekaj
*Assistant Examiner* — Tyler W Sullivan
(74) *Attorney, Agent, or Firm* — F. Chau & Associates, LLC

(57) ABSTRACT

A 3D image display device includes a display device including a plurality of pixels and displaying each of a left-eye image and a right-eye image. The display device inserts an black image between the left-eye image and the right-eye image such that the left-eye image is displayed for part of four frames and the black image is displayed for the remaining frames and the right-eye image is displayed for part of four other frames and the black image is displayed for the remaining other frames.

8 Claims, 17 Drawing Sheets

(56) References Cited

U.S. PATENT DOCUMENTS

| | | | |
|---|---|---|---|
| 2005/0184944 A1 | 8/2005 | Miyata et al. | |
| 2006/0256141 A1 | 11/2006 | Maruyama et al. | |
| 2007/0035707 A1* | 2/2007 | Margulis | G03B 21/26 353/122 |
| 2007/0085794 A1* | 4/2007 | Kawabe | G09G 3/342 345/89 |
| 2007/0146394 A1 | 6/2007 | Ahn | |
| 2007/0205969 A1* | 9/2007 | Hagood, IV | G02B 26/004 345/84 |
| 2007/0236603 A1 | 10/2007 | Itoh et al. | |
| 2008/0068359 A1* | 3/2008 | Yoshida | G09G 3/3406 345/204 |
| 2009/0109247 A1 | 4/2009 | Kimura | |
| 2009/0123030 A1* | 5/2009 | De La Barre | H04N 13/0409 382/103 |
| 2009/0146914 A1 | 6/2009 | Seong et al. | |
| 2009/0237495 A1 | 9/2009 | Kawahara | |
| 2009/0289968 A1* | 11/2009 | Yoshida | G09G 3/2025 345/691 |
| 2010/0309381 A1* | 12/2010 | Nakagawa | H04N 13/0438 348/705 |
| 2011/0018983 A1 | 1/2011 | Kim et al. | |
| 2011/0050860 A1 | 3/2011 | Watson | |
| 2011/0090324 A1* | 4/2011 | Mentz | H04N 13/0438 348/55 |
| 2011/0096146 A1* | 4/2011 | Hulyalkar | H04N 13/0438 348/43 |
| 2011/0279451 A1* | 11/2011 | Haga | G09G 3/003 345/419 |
| 2012/0127160 A1* | 5/2012 | Won-Kim | H04N 13/0438 345/419 |

* cited by examiner

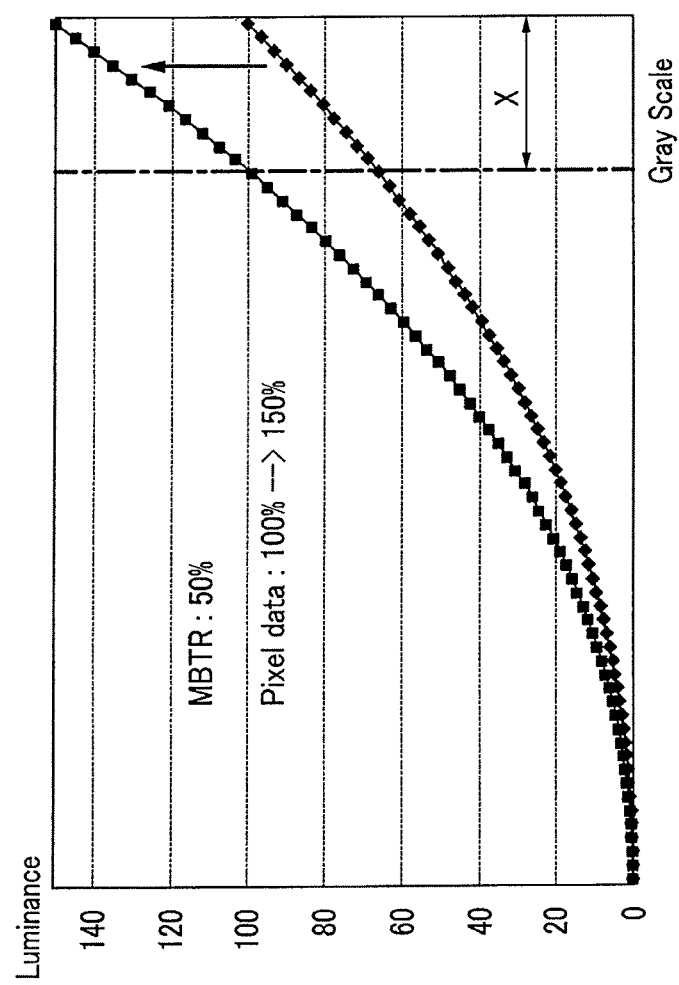

3 DIMENSIONAL IMAGE DISPLAY DEVICE

CROSS-REFERENCE TO RELATED APPLICATION

This application is a divisional application of co-pending U.S. application Ser. No. 13/088,695 filed Apr. 18, 2011, which claims priority to Korean Patent Application No. 10-2010-0093704 filed in the Korean Intellectual Property Office on Sep. 28, 2010, the disclosure of which is incorporated by reference herein.

BACKGROUND OF THE INVENTION (a) Technical Field

Embodiments of the present invention relate to a 3 dimensional image display device.

(b) Discussion of Related Art

A 3 dimensional image may be visualized by stereo vision through both eyes. A binocular disparity is generated by a visual disparity between both eyes, i.e., the distance between both eyes. For example, the left and right eyes view different 2D images and when both images are transferred to the brain through the retina, the brain fuses the images to reproduce the original 3D image.

Autostereoscopy is a method of displaying stereoscopic (3D) images without the use of special glasses on the part of the viewer. An autostereoscopic 3D image display device may include a lenticular lens layer disposed on a liquid crystal display. However, with this display device, the images transferred to the right and left eyes are not clearly discriminated, which produces a 3D effect with a low quality.

A stereoscopic 3D image display device has an additional cost since it requires additional glasses, but allows many people to view 3D images with improved quality since images transferred to the left and right eyes can be more clearly discriminated.

SUMMARY OF THE INVENTION

At least one embodiment of the present invention has been made in an effort to provide a 3 dimensional image display device that improves 3D display quality and improves display luminance by allowing images transferred to the right and left eyes to be more clearly discriminated and recognized.

An exemplary embodiment of the present invention provides a 3D image display device which includes a display device having a plurality of pixels and displaying each of a left-eye image and a right-eye image. The display device inserts an insertion image between the left-eye image and the right-eye image such that the left-eye image is displayed for part of four frames and the insertion image is displayed for the remaining frames, and the right-eye image is displayed for part of four other frames and the insertion image is also displayed for the remaining other frames.

The device may further include glasses including a left lens and a right lens which are alternately turned on and off. The left lens may be in an on state while the left-eye image is displayed and the right lens may be in the on state while the right-eye image is displayed.

The left-eye image or the right-eye image may be displayed for one frame and the insertion image is displayed for three frames or the left-eye image or the right-eye image may be displayed for two frames and the insertion image is displayed for two frames. The left-eye image or the right-eye image may be displayed for three frames and the insertion image may be displayed for one frame. Both the left lens and the right lens may be in an off state while the left-eye image and the right-eye image are overlapped with each other in the display device.

Data representing additional luminance may be additionally included in (or applied to) at least one of the left-eye image, the right-eye image, and the insertion image to display an image.

In any one of four frames in which the left-eye image and the insertion image are displayed and four frames in which the right-eye image and the insertion image are displayed, the data representing the additional luminance may be included in (or applied to) only one image of the first to third frames among the four frames to be displayed.

When the data representing the additional luminance is not included in (or applied to) the image of the first frame, the data may be included in (or applied to) the image of the second frame, and when the data is not included in (or applied to) the image of the second frame, the data may be included in (or applied to) the image of the third frame.

In any one of four frames in which the left-eye image and the insertion image are displayed and four frames in which the right-eye image and the insertion image are displayed, the data representing the additional luminance may be all included in (or applied to) both the images of the first and second frames among the four frames to be displayed.

The data representing the additional luminance included in (or applied to) the image of the first frame and the data representing the additional luminance included in (or applied to) the image of the second frame may have different intensities from each other. The data representing the additional luminance included in (or applied to) the image of the first frame and the data representing the additional luminance included in (or applied to) the image of the second frame may have the same intensity as each other.

The device may further include a 3D image processor adding the data representing the additional luminance to image data for application to a frame. The 3D image processor may include a gamma converter generating gamma-converted data from image data, a luminance improver improving the luminance of the gamma-converted data, and a reverse gamma converter reverse gamma converting the data having the improved luminance. The gamma converter may generate output data having a bit number higher than the data input thereto. The output data may be generated by a lookup table. The reverse gamma converter may generate output data having a bit number less than the data input thereto.

The 3D image processor may further include a luminance improvement rate provider. The luminance improver may further include a luminance improvement data generator and a frame memory. The luminance improvement data generator may generate data having an improved luminance depending on a luminance improvement rate (e.g., a maximum boost up threshold rate) provided from the luminance improvement rate provider. The frame memory may store the data generated by the luminance improvement data generator.

The luminance improvement data generator may generate data corresponding to a total four frames through Equation 2 if a result of Equation 1 as below is true, and generate data corresponding to a total four frames through Equation 3 if the result is false.

$$L^*(MBTR+1) < \text{Max } L10^{1.2} \qquad \text{[Equation 1]}$$

$$LN <= L^*(MBTR+1)$$

$$LN+1 \leq L*(MBTR+1)$$

$$LN+2 \leq 0 \quad \text{[Equation 2]}$$

$$LN \leq MAX\ L$$

$$LN+1 \leq MAX\ L$$

$$LN+2 \leq \{L*(MBTR+1)-MAX\ L\}*2 \quad \text{[Equation 3]}$$

wherein L represents the luminance data inputted into the luminance improvement data generator 260, MBTR represents the luminance improvement rate (max boost up threshold rate), Max L($10^{12}$) represents a maximum displayable luminance, and LN, LN+1, and LN+2 represent luminance data of an N frame, the luminance data of an N+1 frame, and the luminance data of an N+2 frame, respectively. In Equation 2 and Equation 3, the luminance data of the N+3 frame may be black data.

The 3D image processor may further include a balance rate provider that provides a rate (a balance rate) for determining which of two frames data representing an additional luminance is to be more greatly added to when additional luminances are to be added to both the first and second frames. The balance rate may be applied to the luminance improver and considered when data corresponding to a total four frames are generated in the luminance improver.

According to at least one exemplary embodiment of the present invention, a 3D image display device is provided that allows an image transferred to a right eye and an image transferred to a left eye to be more clearly discriminated and recognized. Further other embodiments may additionally improve the display quality of a 3D image by improving the luminance of a liquid crystal display.

According to an exemplary embodiment of the invention, a 3D image display device includes a display device having a plurality of pixels. The display device is configured to display a left-eye image for between one to three frames of four consecutive first frames followed by an all black image for the remaining first frames. The display device is configured to display a right-eye image for between one to three frames of four consecutive second frames followed by the same all black image for the remaining second frames.

BRIEF DESCRIPTION OF THE DRAWINGS

FIG. 21 is a graph showing improved luminance of a 3D image display device according to an exemplary embodiment of the present invention.

DETAILED DESCRIPTION OF EXEMPLARY EMBODIMENTS

Figure 1:
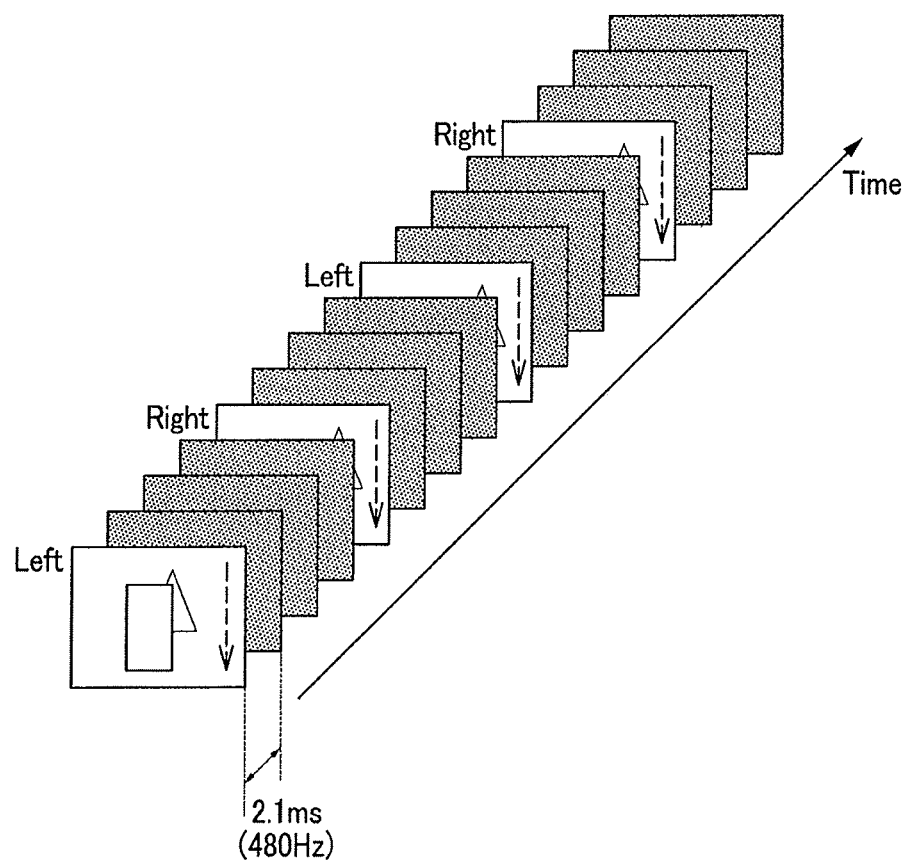
FIG. 1 is a schematic diagram showing an operation state of a 3 dimensional image display device according to an exemplary embodiment of the present invention.

The present invention will be described more fully hereinafter with reference to the accompanying drawings, in which exemplary embodiments of the invention are shown.

In the drawings, the thickness of layers, films, panels, regions, etc., may be exaggerated for clarity. Like reference numerals designate like elements throughout the specification. It will be understood that when an element such as a layer, film, region, or substrate is referred to as being "on" another element, it can be directly on the other element or intervening elements may also be present.

FIGS. 1 to 6 describe exemplary embodiments of the invention that may reduce crosstalk in which a left-eye image and right-eye image are misperceived by a right eye and left eye, respectively. The embodiments may involve high-speed driving of left and right eye images along with black images interposed between the driven images.

Figure 2:
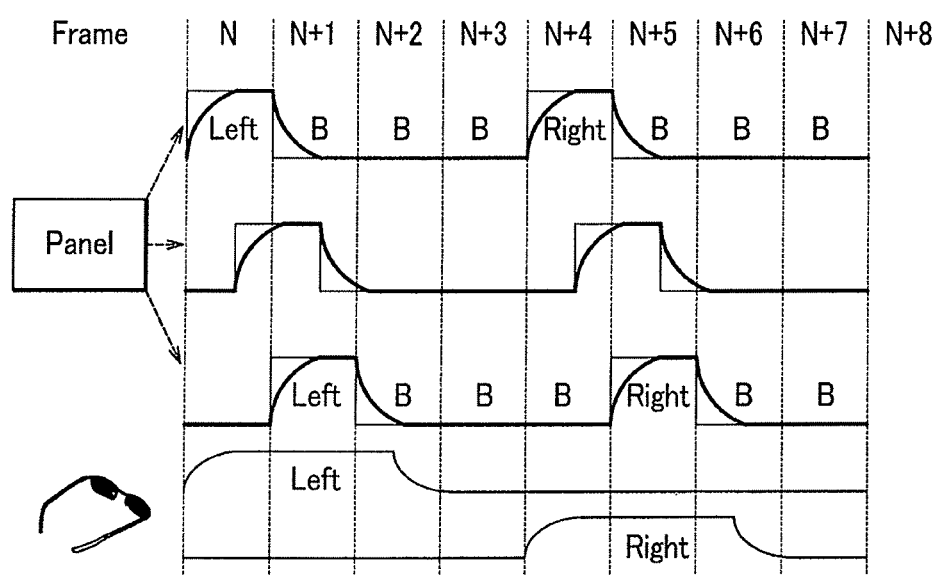
FIG. 2 is a graph showing a signal waveform of the 3D image display device according to the exemplary embodiment of FIG. 1.

FIG. 1 is a schematic diagram showing an operation state of a 3 dimensional image display device according to an exemplary embodiment of the present invention and FIG. 2 is a graph showing a signal waveform of the 3D image display device according to the exemplary embodiment of FIG. 1.

The 3D image display device includes a display device and glasses. As an example, the display device may be a liquid crystal display, an organic light emitting diode display, etc. Hereinafter, the liquid crystal display will primarily be described as the display device merely for ease of discussion.

The liquid crystal display includes a liquid crystal display panel and a backlight unit (not shown). The liquid crystal display panel includes a plurality of pixels. The liquid crystal display panel controls the intensity of transmitted light by changing a liquid crystal alignment direction using an electric field generated between two electrodes to display an image.

The liquid crystal display panel may include an upper substrate, a lower substrate, and a liquid crystal layer injected or interposed between the upper substrate and the lower substrate.

A gate line, a data line, a pixel electrode, and a thin film transistor connected thereto may be formed on the lower substrate. The thin film transistor controls a voltage applied to the pixel electrode on the basis of signals applied to the gate line and the data line. For example, the thin film transistor controls the voltage applied to the pixel electrode by transmitting a voltage applied to the data line from a source electrode to a drain electrode of the thin film transistor and applying the corresponding voltage to the pixel electrode connected with the drain electrode if the voltage inputted through the gate line is equal to or higher than a predetermined level. The pixel electrode may be formed by a semi-transmissive pixel electrode having a transmission region and a reflective region in some exemplary embodiments. Further, a storage capacitor may be additionally formed to sustain the voltage applied to the pixel electrode for a predetermined duration. The thin film transistor and the pixel electrode may form one pixel. A black matrix, a color filter, and a common electrode may be formed on the upper substrate, which opposes the lower substrate.

The liquid crystal layer between the upper substrate and the lower substrate may have vertically aligned (VA)-mode liquid crystals that are vertically aligned with respect to a substrate surface when no electric field is applied between the common electrode and the pixel electrode. However, embodiments of the invention are not limited thereto, as the liquid crystal layer may include liquid crystals of a twisted nematic (TN) mode, liquid crystals of an electrically controlled birefringence (ECB) mode, etc.

A polarizer may be attached onto each of an outer surface of the upper substrate and an outer surface of the lower substrate. A compensation film may be added between the substrate surface and the polarizer in some exemplary embodiments.

At least one of the color filter, the black matrix, and the common electrode that are formed on the upper substrate may be formed on the lower substrate in some exemplary embodiments and when both the common electrode and the pixel electrode are formed on the lower substrate, at least one of both electrodes may be formed as a linear electrode.

The backlight unit, which provides light to the liquid crystal display panel, includes a lamp. A reflection plate, a light guide plate, and a luminance enhancement film may used with the backlight unit to guide light emitted from the lamp to toward the liquid crystal display panel. A fluorescent lamp such as a cold cathode fluorescent (CCFL) or an LED may be used as the lamp. Light from the backlight unit is either transmitted to the liquid crystal display panel or blocked. A gray is expressed depending on the transmission level of the light.

A right lens and a left lens of the glasses are configured to alternately block light at a predetermined cycle in synchronization with the liquid crystal display panel. For example, according to FIGS. 1 and 2, the light is first blocked (off) on the right lens and transmitted (on) on the left lens. Thereafter, the light is transmitted (on) on the right lens and blocked (off) on the left lens. As a result, the image is perceived by only the left eye for a predetermined duration and the image is perceived by only the right eye for the subsequent predetermined duration. A 3D image is perceived by a difference between the images perceived by the left eye and the right eye.

As such, when the lenses of the glasses are on/off, the image to be transferred to the left eye and the image to be transferred to the right eye are displayed depending on the on and off operations of the lenses, respectively on the liquid crystal display panel.

Each of the images transferred to the left and right eyes are displayed on the liquid crystal display panel. Black data is inserted between both images to allow discrimination between the image transferred to the left eye and the image transferred to the right eye.

For example, the liquid crystal display panel displays the image to be transferred to the left eye using N to N+3 frames in FIG. 2. A frame inserted with the black data is shaded in FIG. 1. The same notation is applied in FIGS. 3 and 5.

A gate-on voltage is sequentially applied to the gate line to apply a data voltage to the pixel electrode through the thin film transistor connected to the corresponding gate line. When this occurs, the applied data voltage may be referred to as a left data voltage, which is for expressing the image to be transferred to the left eye. The applied left data voltage is sustained by the storage capacitor for a predetermined duration. (See N frame of FIG. 2)

Thereafter, the gate-on voltage is sequentially applied to the gate line again to apply a black data voltage to the pixel electrode through the thin film transistor connected to the corresponding gate line. When this occurs, the applied black data voltage, which is used to display a black image inserted between the image to be transferred to the left eye and the image to be transferred to the right eye, may discriminate both images from each other. The applied black data voltage is also sustained by the storage capacitor for a predetermined duration. (See N+1 to N+3 frames of FIG. 2)

Thereafter, the liquid crystal display panel displays the image to be transferred to the right eye as follows using N+4 to N+7 frames of FIG. 2.

The gate-on voltage is sequentially applied to the gate line to apply data voltage to the pixel electrode through the thin film transistor connected to the corresponding gate line. When this occurs, the applied data voltage may be referred to as right data voltage, which is for expressing the image to be transferred to the right eye. The applied right data voltage is sustained by the storage capacitor for a predetermined duration. (See N+4 frame of FIG. 2)

Thereafter, the gate-on voltage is sequentially applied to the gate line again to apply the black data voltage to the pixel electrode through the thin film transistor connected to the corresponding gate line. When this occurs, the applied black data voltage, which is used to display the black image inserted between the image to be transferred to the left eye and the image to be transferred to the right eye, may discriminate both images from each other. Further, the applied black data voltage is also sustained by the storage capacitor for a predetermined duration. (See N+4 to N+7 frames of FIG. 2)

FIG. 2 shows the relationship between the operation of the liquid crystal display panel and the on/off operation of the glasses. The arrows emanating from the liquid crystal display panel and their direction represent a sequence of applying the gate-on voltage to respective gate lines. For example, in an exemplary embodiment of the present invention, the arrow direction represents that a gate-on signal is applied from an upper gate line to subsequent gates lines of the panel to sequentially apply the gate-on signal.

The liquid crystal display panel is shown with respect to 8 frames in FIG. 2. Referring to FIG. 2, a state in which an image transferred from the left side to the left eye is displayed occurs in the N frame, a state in which the black data is displayed occurs in the N+1 to N+3 frames, a state in which the image transferred to the right eye is displayed occurs in the N+4 frame, and a state in which the black data is displayed occurs in the N+5 to N+7 frames. In synchronization therewith, the left lens of the glasses is in an on state and the right lens of the glasses is in an off state from the N frame to the middle of the N+2 frame. Both lenses are in the off state from the middle of the N+2 frame to the N+3 frame. Further, the left lens is in the off state and the right lens is in the on state from the N+4 frame to the middle of the N+6 frame. Both lenses are in the off state from the middle of the N+6 frame to the N+7 frame. The glasses may be set to change the on/off state of the glasses every two frames of the liquid crystal display panel and have a section in which both lenses are in the off state therebetween. In the exemplary embodiment of the present invention, each frame of the liquid crystal display panel may have an inversion cycle of 480 Hz. However, embodiments of the present invention are limited to any particular inversion cycle.

As a result, the image perceived by the left eye is an image displayed in the N frame and the image perceived by the right eye is an image displayed in the N+4 frame. As such, a sense of depth is perceived since the images received by both eyes are different from each other, thereby creating a 3D effect. The sense of depth (distance) may be adjusted so that one perceives both objects are more distant from each other by adjusting the difference between the images perceived by both eyes.

Referring to FIG. 2, the left eye and the right eye of the glasses are changed from the on state to the off state in the middle of the N+2 frame and in the middle of the N+6 frame. However, in alternate exemplary embodiments of the invention, the time when the left eye and the right eye of the glasses are changed from the on state to the off state may coincide with the start of the N+2 frame and the start of the N+6 frame, or may be positioned in the N+3 frame (e.g., at its start, its middle, etc) and in the N+7 frame (e.g., at its start, middle, etc.). For example, unlike FIG. 2, the left lens and the right lens may be changed from the on state to the off state between the N+2 frame and the N+3 frame and between the N+6 frame and the N+7 frame.

The image transferred to the left eye and the image transferred to the right eye may be clearly discriminated from each other by inserting the black data image.

When a data voltage is applied to the pixel electrode, a predetermined time may be required to change an alignment direction depending on an electric field generated by the applied data voltage on the liquid crystal layer, which is marked with a bold line on the panel of FIG. 2 (e.g., see the thin quadrangular waveform that represents a change of the applied data voltage.) For example, even if the data voltage is instantly changed, it takes a certain amount of time before the luminance level reaches a desired level by changing the alignment direction of liquid crystals. Further, a difference in data voltage applying time between a pixel row to which the data voltage is firstly applied and a pixel row to which the data voltage is last applied is generated in one frame.

Therefore, because of the temporal difference, when the image transferred to the left eye is displayed and thereafter, the image transferred to the right eye may be immediately displayed in the subsequent frame, even though the on/off state of the lenses of the glasses 300 is changed and the image applied to the opposite side can be perceived for some time. Therefore, the quality of stereographic images may deteriorate between both eyes to deteriorate the display quality of the 3D image. However, in at least one embodiment of the present invention, the left eye perceives the image transferred to the left eye and the black image, and the right eye perceives the image transferred to the right eye and the black image, by inserting the black data voltage between the left data voltage and the right data voltage to maintain a stereograph between both eyes as it is. As a result, the display quality of the 3D image is improved.

As described above, in the exemplary embodiment of the present invention, the black data voltage is inserted between the left data voltage and the right data voltage. However, the black data voltage may be a data voltage representing luminance higher than black as well as a data voltage representing black. For example, in alternate embodiments, a data voltage representing a luminance higher than black is applied instead of the black data voltage.

In FIGS. 1 and 2, by displaying the left-eye image or the right-eye image for one frame and displaying the black image for three frames, the number of frames to display the black image is larger than that of frames to display the image (the left-eye image or the right-eye image). Therefore, the left-eye image and the right-eye image should be more clearly discriminated from each other and the images should not be transferred to opposite eyes. For example, the image designated for the left eye should not be sent erroneously to right eye and vice versa. However, the luminance is generally decreased.

Figure 3:
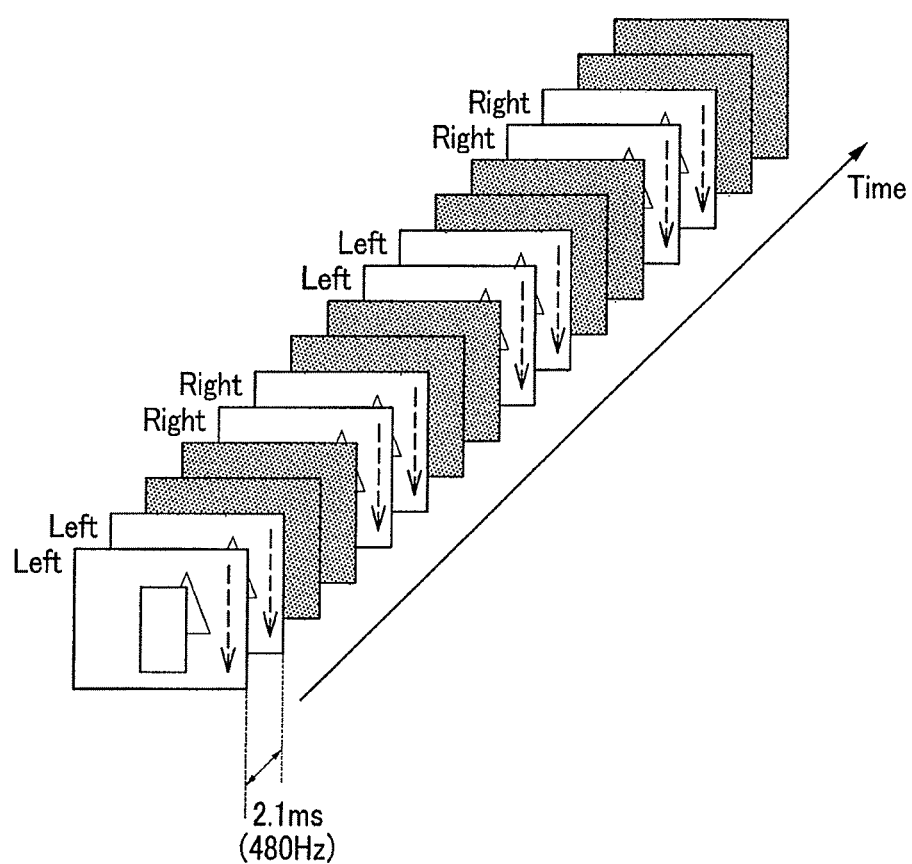
FIG. 3 is a schematic diagram showing an operation state of a 3 dimensional image display device according to an exemplary embodiment of the present invention.

An exemplary embodiment of the present invention will be described with reference to FIGS. 3 to 6. FIG. 3 is a schematic diagram showing an operation state of a 3 dimensional image display device according to an exemplary embodiment of the present invention and FIG. 4 is a graph showing a signal waveform of the 3D image display device according to the exemplary embodiment of FIG. 3.

Figure 4:
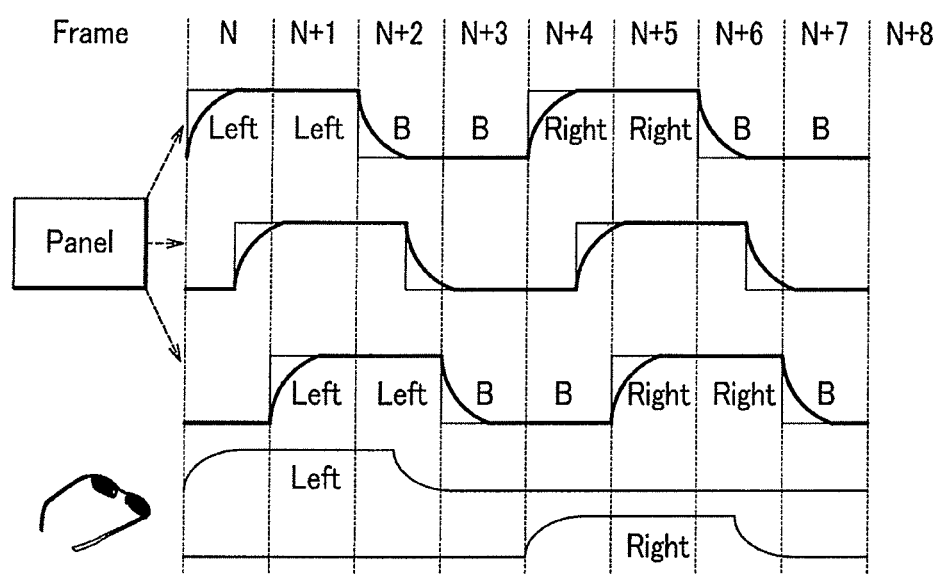
FIG. 4 is a graph showing a signal waveform of the 3D image display device according to the exemplary embodiment of FIG. 3.

FIGS. 3 and 4 illustrate an embodiment where the number of frames to display the black image is equal to that of frames to display the image (the left-eye image or the right-eye image) by displaying the left-eye image or the right-eye image for two frames and displaying the black image for two frames.

In the exemplary embodiment of FIGS. 3 and 4, luminance is more improved than the luminance in the exemplary embodiment of FIGS. 1 and 2. Although a time to display the black is required after the black data is applied to the last row on the liquid crystal display panel (see the N+3 frame), the right-eye image is applied in the N+4 frame. Therefore, crosstalk in which the left-eye image and the right-eye image are wrongly transferred should not occur.

In the exemplary embodiment of FIGS. 3 and 4, timings when the left lens and the right lens of the glasses are changed from the on state to the off state coincide with the start of the N+3 frame and the start of the N+7 frame, respectively, but may be positioned in the middle of the N+3 frame and the middle of the N+7 frame.

Figure 5:
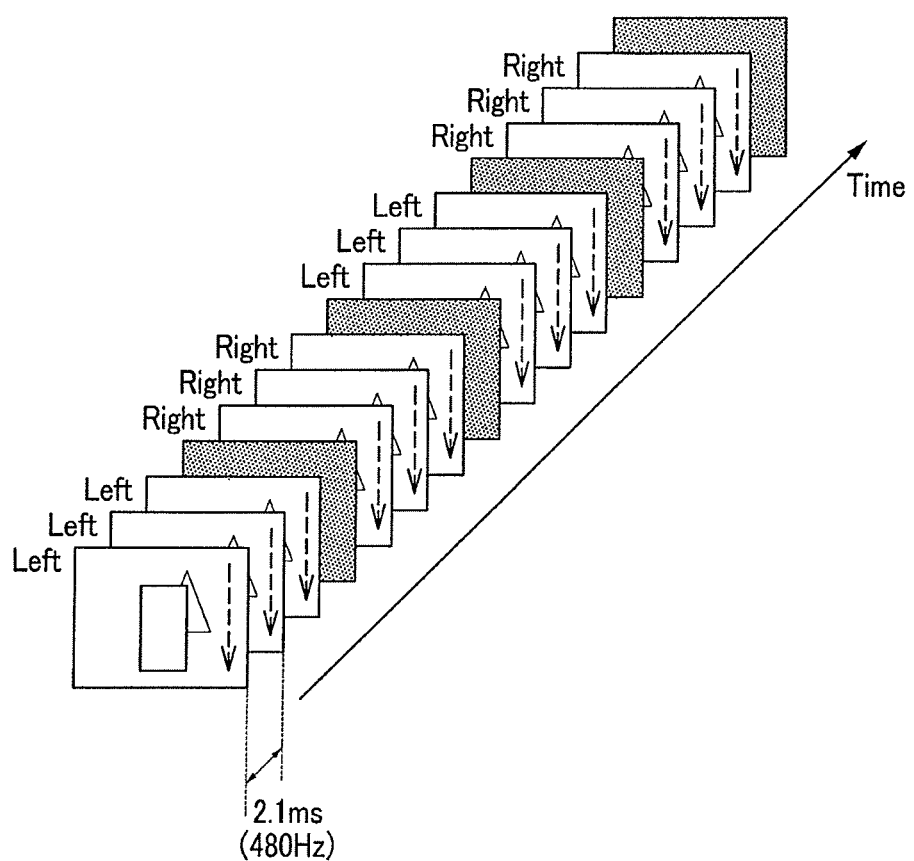
FIG. 5 is a schematic diagram showing an operation state of a 3 dimensional image display device according to an exemplary embodiment of the present invention.
Figure 6:
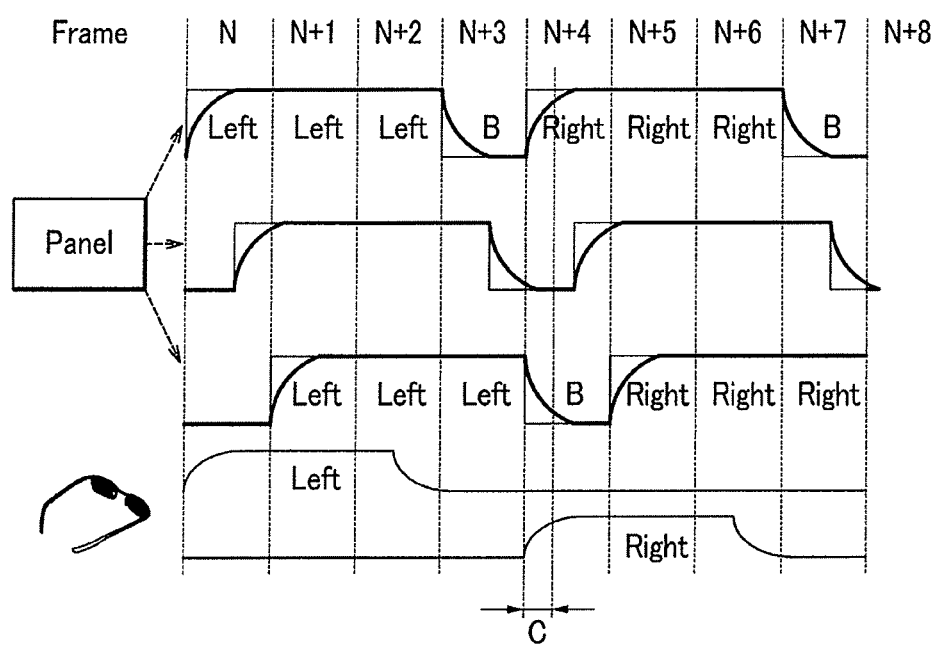
FIG. 6 is a graph showing a signal waveform of the 3D image display device according to the exemplary embodiment of FIG. 5.

FIGS. 5 and 6 illustrate an embodiment of the present invention. FIG. 5 is a schematic diagram showing an operation state of a 3 dimensional image display device according to an exemplary embodiment of the present invention and FIG. 6 is a graph showing a signal waveform of the 3D image display device according to the exemplary embodiment of FIG. 5.

In FIGS. 5 and 6, by displaying the left-eye image or the right-eye image for three frames and displaying the black image for one frame, the number of frames to display the black image is smaller than that of frames to display the image (the left-eye image or the right-eye image). Further, the timings when the left lens and the right lens of the glasses are changed from the on state to the off state coincide with the timings (the start timings of the N+4 frame and the N+8 frame) when the right-eye image and the left-eye image start to be input.

In the exemplary embodiment of FIGS. 5 and 6, luminance is more improved than the luminance in the exemplary embodiment of FIGS. 1 and 2 and the exemplary embodiment of FIGS. 3 and 4, but crosstalk may occur. (See region C of FIG. 6)

Referring to the N+4 frame of FIG. 6, the right-eye image is input on a first upper row of the liquid crystal display panel and the black data is input on a last row with the start of the N+4 frame, but partial luminance of the left-eye image may be perceived while the right-lens is on for a response time of the liquid crystal display panel. For example, crosstalk may partially occur to prevent the left-eye image and the right-eye image from being clearly discriminated from each other.

However, a predetermined time interval is present between actual frames to prevent the left-eye image from being completely viewed for the corresponding interval and prevent the left-eye image from being perceived by the right eye by delaying the on timing of the right lens. For example, during the interval in which the left-eye image and the right-eye image are overlapped with each other, both lenses of the glasses are in the off state to remove the crosstalk.

In the exemplary embodiment of FIGS. 5 and 6, luminance is more improved than the luminance in other exemplary embodiments, but crosstalk may partially occur. Therefore, the exemplary embodiment may be adjusted to prevent crosstalk from occurring as discussed above or when the intensity of the crosstalk is small, even though the crosstalk partially occurs as shown in FIG. 6, the exemplary embodiment may be used as it is. For example, when the embodiment of FIG. 6 is used as it is, since the intensity of the crosstalk actually sensed is small and the degree of improvement of the luminance is large, there may be little or no problem perceiving the 3D image.

As described in the exemplary embodiments of FIGS. 1 to 6, four frames are allocated to the left-eye image and the black image and four frames are allocated to the right-eye image and the black image with high-speed driving (e.g., at 480 Hz). Application rates of four frames with respect to the left-eye image and the black image are adjusted, and as a result, the 3D image is displayed by alternately turning on/off the left lens and the right lens of the glasses.

Since the left-eye image and the right-eye image are displayed for a longer time in the exemplary embodiment of FIGS. 3 and 4 than in the exemplary embodiment of FIGS. 1 and 2, and longer in the exemplary embodiment of FIGS. 5 and 6 than in the exemplary embodiment in FIGS. 3 and 4, each subsequent embodiment further improves the luminance. However, in the exemplary embodiment of FIGS. 5 and 6, crosstalk may occur.

As described in the exemplary embodiments of FIGS. 1 to 6, the black image is inserted to discriminate the left-eye image and the right-eye image from each other, but since the black image is inserted, the luminance which can be displayed is reduced on the whole.

However, in alternate embodiment of the invention, the display luminance may be improved as described below.

FIG. 7, FIG. 8, FIG. 9, FIG. 10, FIG. 11, FIG. 12, FIG. 13A, FIG. 13B and FIG. 13C are graphs showing a method of improving luminance displayed by a 3D image display device according to an exemplary embodiment of the present invention.

In an exemplary embodiment of the present invention, additional luminance is used to display a luminance higher than the luminance displayed by the input image data (left-eye image data and right-eye image data).

The exemplary embodiments of FIG. 7, FIG. 8, FIG. 9, FIG. 10, FIG. 11, FIG. 12, FIG. 13A, FIG. 13B and FIG. 13C will be described based on the exemplary embodiment in which the left-eye image and the right-eye image is displayed for two frames among a total four frames as described in FIGS. 3 and 4. However, this embodiment may also be applied to the exemplary embodiment of FIGS. 1 and 2 or the exemplary embodiment of FIGS. 5 and 6.

Figure 7:
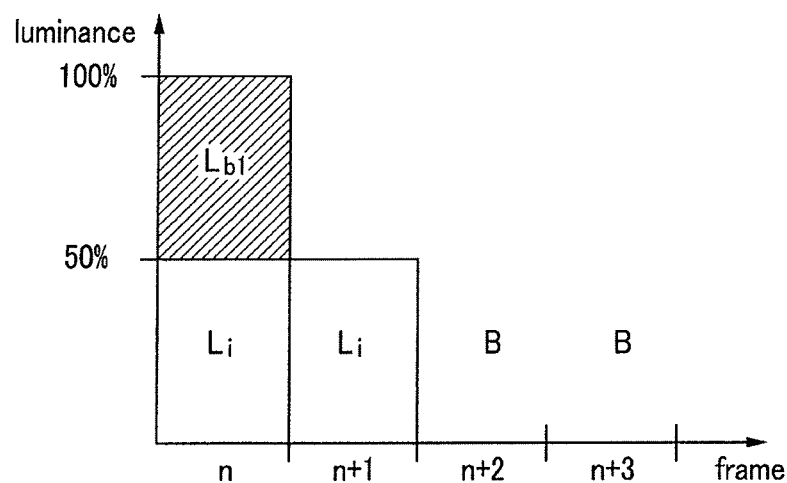
FIG. 7, FIG. 8, FIG. 9, FIG. 10, FIG. 11, FIG. 12, FIG. 13A, FIG. 13B and FIG. 13C are graphs showing a method of improving luminance displayed by a 3D image display device according to an exemplary embodiment of the present invention.

Referring to FIG. 7, an additional luminance Lb1 is additionally displayed only in the display luminance Li of the left-eye or right-eye image displayed in the N frame, which is the first frame among the N frame to N+3 frame.

For example, in the exemplary embodiment in which the same luminance Li is displayed by displaying the image in the first and second frames among a total four frames and no luminance is displayed by displaying the black image in the third and fourth frames, the additional luminance Lb1 is applied to the luminance displayed in the first frame to improve the luminance displayed on the display panel on the whole.

The intensity or degree of the additional luminance Lb1 may vary and a method of determining the intensity or degree of the additional luminance will be described below with reference to FIG. 14, FIG. 15, FIG. 16, FIG. 17, FIG. 18, FIG. 19 and FIG. 20.

Further, in FIG. 7, the display luminance Li of the left-eye or right-eye image is 50% of displayable luminance and the luminance adding the additional luminance Lb1 is 100% of the displayable luminance, but they may have various values in some exemplary embodiments.

Figure 8:
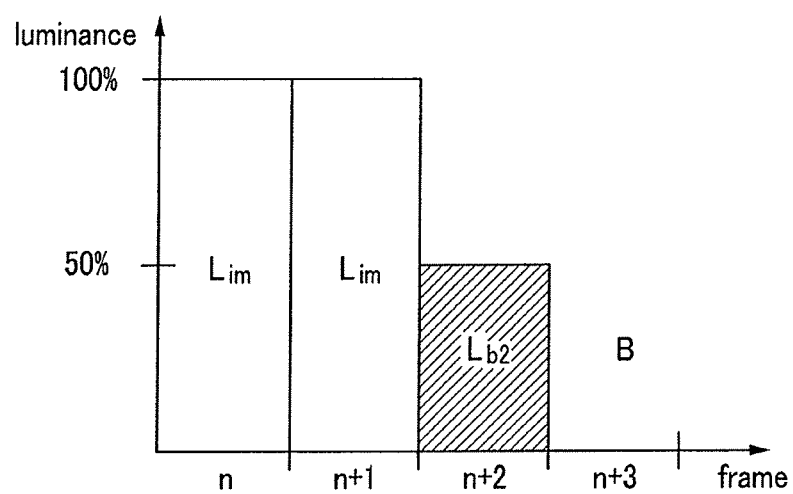

In the exemplary embodiment of FIG. 8, an additional luminance Lb2 is displayed in the third frame unlike the exemplary embodiment of FIG. 7. In FIG. 8, the luminance displayed by the left-eye or right-eye image is 100% (Lim: maximum luminance) of the displayable luminance in the first and second frames, but is not necessarily limited thereto. For example, as shown in FIG. 8, since the additional luminance Lb2 cannot be added in the first and second frames, the additional luminance Lb2 may be applied in the third frame. However, even when the displayed luminance of the first and second frames is not at the maximum luminance, the additional luminance Lb2 may be applied in the third frame.

However, in the exemplary embodiment of FIG. 8, crosstalk may occur similarly as in the exemplary embodiment of FIGS. 5 and 6. Therefore, the additional luminance Lb2 may be applied by taking care of the crosstalk.

Figure 9:
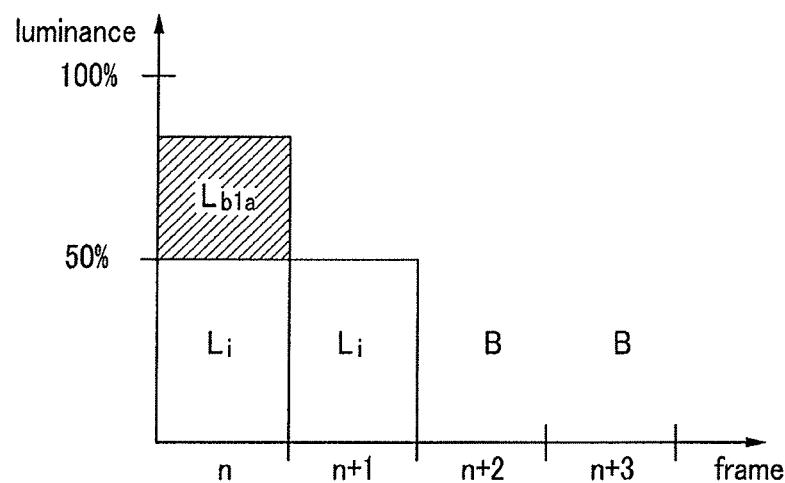
Figure 10:
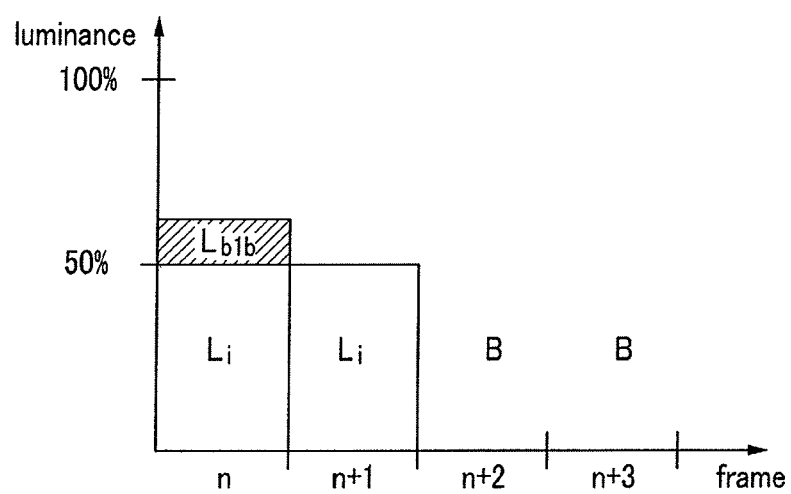

FIGS. 9 and 10 illustrate an exemplary embodiment in which the additional luminance Lb1 is separately displayed depending on the display degree of the additional luminance Lb1 displayed in accordance with the exemplary embodiment of FIG. 7.

An additional luminance Lb1a of FIG. 9 has a luminance comparatively higher than an additional luminance Lb1b of FIG. 10 and is applicable where the luminance of the display device needs to be more greatly improved. FIG. 10 is applicable when it is enough to merely add a comparatively lower luminance. As shown in FIGS. 9 and 10, the intensity of the additional luminance Lb1 is adjustable and it will be described with respect to FIG. 14, FIG. 15, FIG. 16, FIG. 17, FIG. 18, FIG. 19 and FIG. 20.

Figure 11:
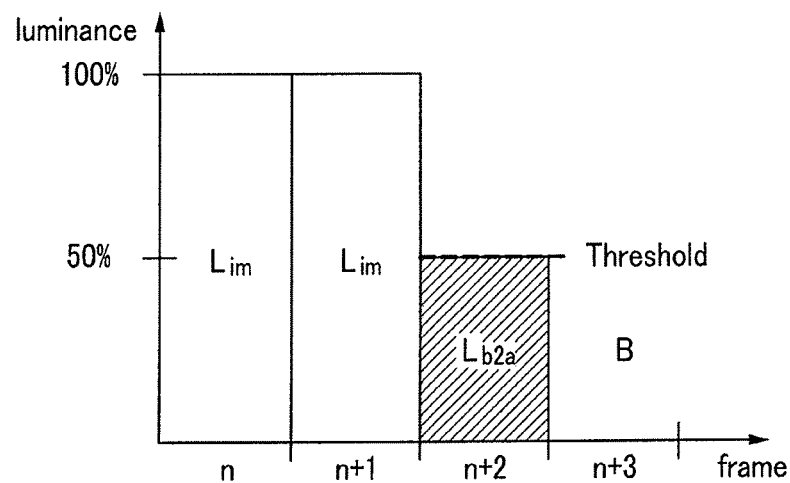
Figure 12:
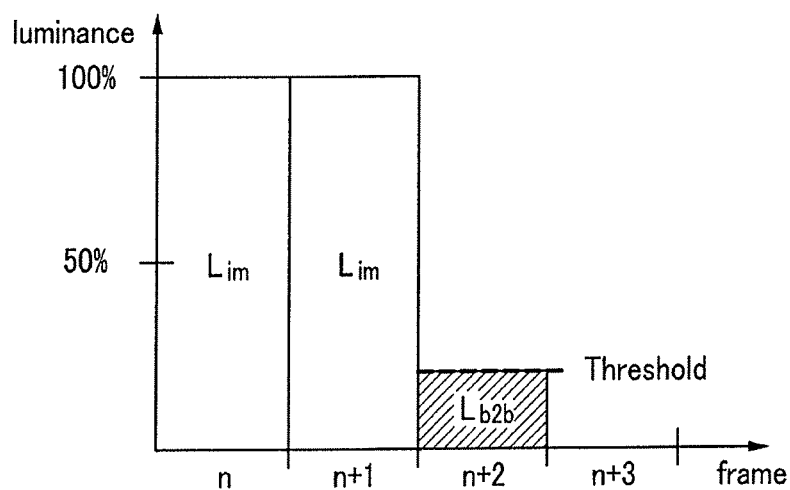

FIGS. 11 and 12 illustrate an exemplary embodiment in which the additional luminance Lb2 is separately displayed depending on the display degree of the additional luminance Lb2 applied in accordance with the exemplary embodiment of FIG. 8.

An additional luminance Lb2a of FIG. 11 has a luminance comparatively higher than additional luminance Lb2b of FIG. 12 and is applicable where the luminance of the display device needs to be more greatly improved. FIG. 12 is applicable when it is enough to merely add a comparatively lower luminance. As shown in FIGS. 11 and 12, the intensity of the additional luminance Lb2 is adjustable and it will be described with reference to FIG. 14, FIG. 15, FIG. 16, FIG. 17, FIG. 18, FIG. 19 and FIG. 20.

A threshold is shown in FIGS. 11 and 12. The threshold is a value which may be determined to maintain the luminance of the N+2 frame at an optimum level by considering crosstalk and the improvement degree of the luminance. FIG. 11 illustrates a driving scheme that favors improving the luminance using a higher threshold than FIG. 12 and FIG. 12 illustrates a driving scheme that favors reducing or entirely removing crosstalk over an improvement of the luminance.

Figure 13A:
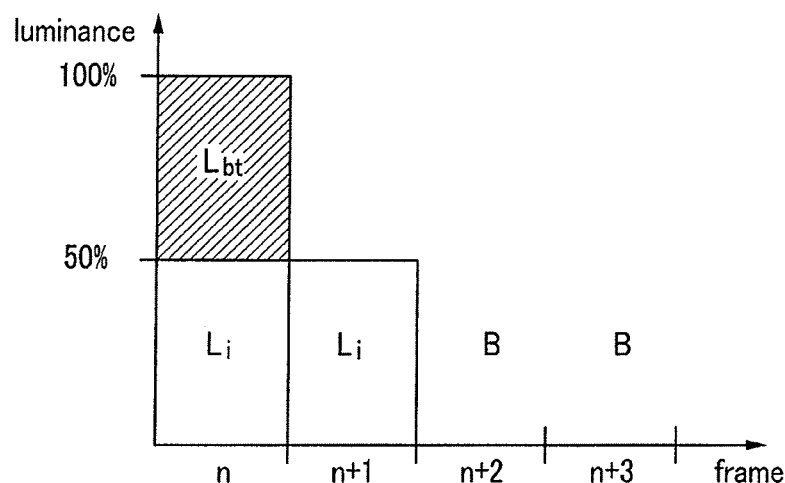

FIG. 13A illustrates an exemplary embodiment in which an additional luminance Lbt is provided only in the first frame like the exemplary embodiment of FIG. 7. When the intensity to be applied to the additional luminance Lbt is determined as shown in FIG. 13A, the additional luminance may be separately provided to the first frame and the second frame as shown in FIGS. 13B and 13C.

Figure 13B:
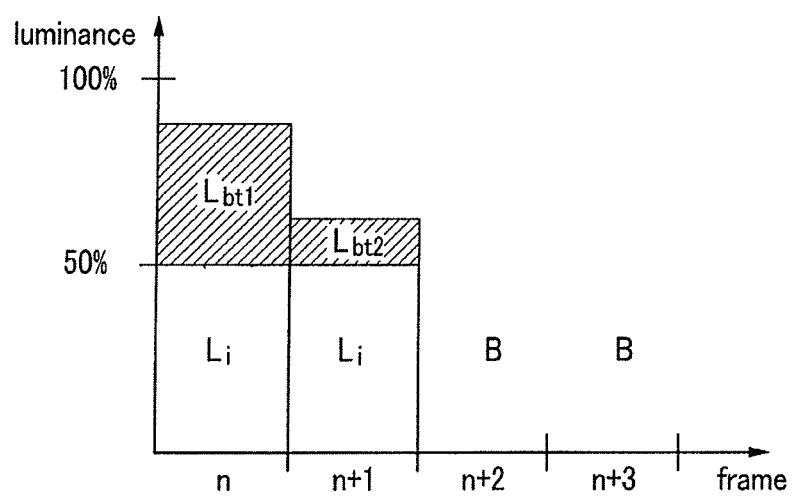
Figure 13C:
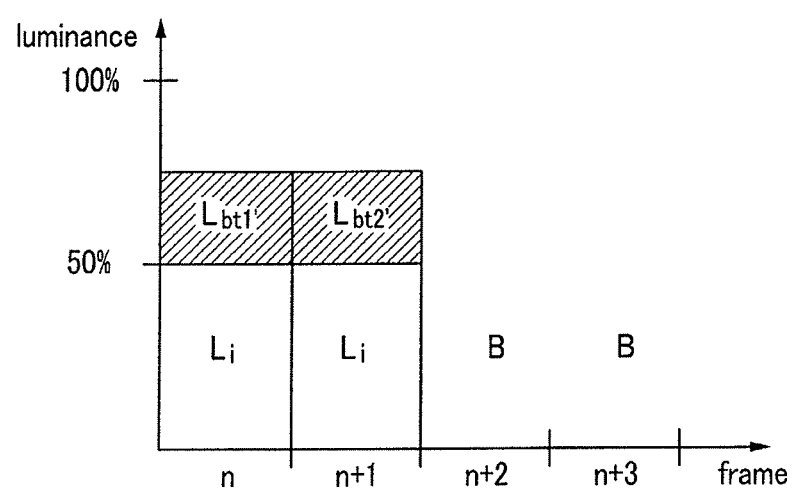

In FIG. 13B, an exemplary embodiment is shown in which additional luminances Lbt1 and Lbt2 are provided to the first frame and the second frame, that are respectively different from each other. In FIG. 13C, an exemplary embodiment is shown in which additional luminances Lbt1' and Lbt2' are provided to the first frame and the second frame, that respectively have the same intensity.

In exemplary embodiments of the present invention, different additional luminances may be provided to both frames like FIG. 13B or the same additional luminance may be provided to both frames like FIG. 13C, which will be described with reference to FIG. 14, FIG. 15, FIG. 16, FIG. 17, FIG. 18, FIG. 19 and FIG. 20.

Figure 14:
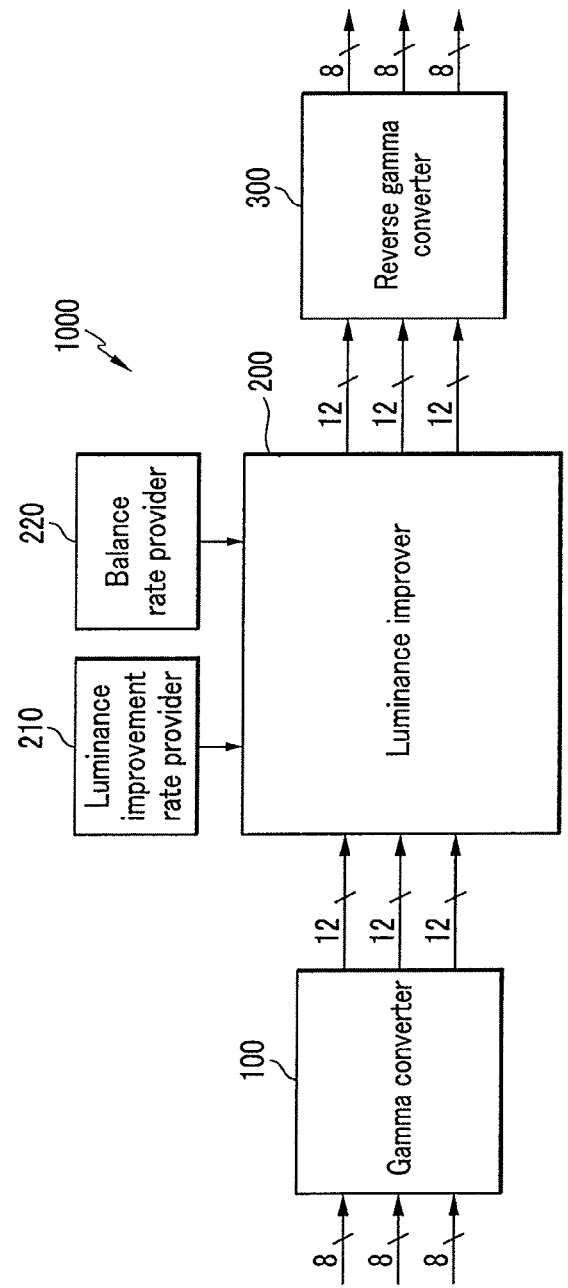
FIG. 14, FIG. 15, FIG. 16, FIG. 17, FIG. 18, FIG. 19 and FIG. 20 are diagrams showing the 3D image processor of a signal controller of a 3D image display device according to an exemplary embodiment of the present invention.

FIGS. 14 to 18 illustrate a 3D image processor that processes image data according to an exemplary embodiment of the present invention. FIG. 14, FIG. 15, FIG. 16, FIG. 17, FIG. 18, FIG. 19 and FIG. 20 are diagrams showing the 3D image processor of the 3D image display device according to an exemplary embodiment of the present invention. FIG. 14 is a diagram showing the overall structure of the 3D image processor.

Referring to FIG. 14, the 3D image processor 1000 includes a gamma converter 100, a luminance improver 200, a reverse gamma converter 300, and further includes a luminance improvement rate provider 210 and a balance rate provider 220 adjusting the degree of luminance improvement in the luminance improver 200.

Figure 15:
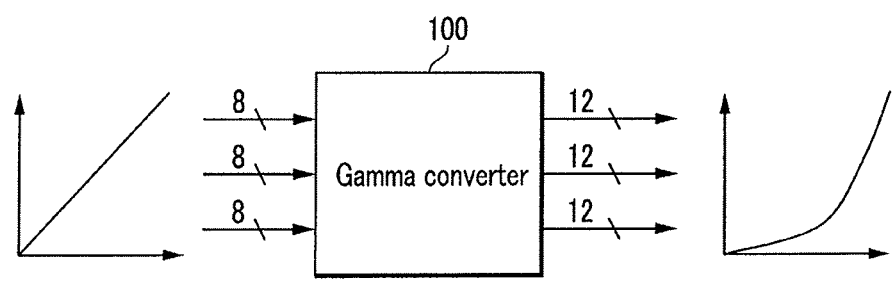

The gamma converter 100 of the 3D image processor 1000 will be described with reference to FIGS. 15 and 16. As shown in FIG. 15, image data (left-eye image data or right-eye image data) input into the 3D image processor 1000 is converted into a value depending on a gamma curve of the display device. As shown in FIG. 15, the input image data has a continuous value depending on a gray, but the image data converted by the gamma converter 100 has a discontinuous value depending on the gray and a bit number thereof is also increased. For example, in the exemplary embodiment of FIG. 15, the input image data is data of 8 bits and the data outputted from the gamma converter 100 is data of 12 bits. However, embodiments of the invention are not limited thereto as the input image data may be smaller or larger than 8 bits and the output image data may be smaller or larger than 12 bits. The output image data is generally bigger than the input image data because a wider range is required since the bit count of the image data is discontinuously varied depending on the gray by the gamma curve.

Figure 16:
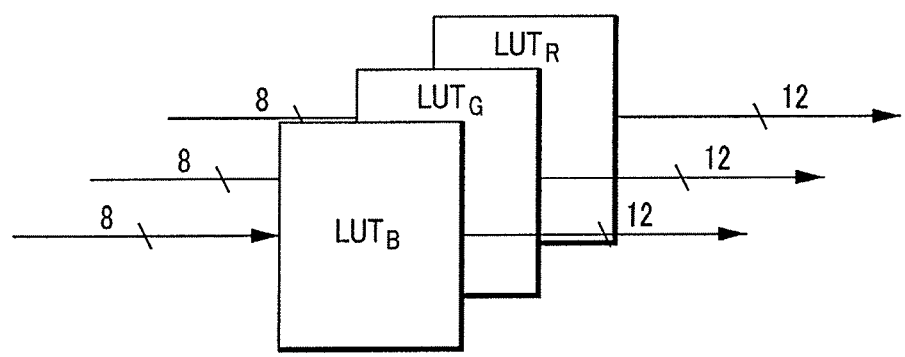

In FIG. 16, an operation of the gamma converter 100 is shown in more detail.

For example, input image data is provided with respect to red, green, and blue, respectively and the input image data of each color is converted through a lookup table (LUT) of stored corresponding colors. According to an exemplary embodiment, when red 8-bit input image data is input, a value corresponding to the data is found in the red lookup table $LUT_R$ and output. When this occurs, the output value has 12 bits. 12-bit output values corresponding to green and blue 8-bit input image data are also found and outputted from lookup tables $LUT_G$ and $LUT_B$. A lookup table (LUT) may output a value which is stored in a memory and corresponds to the input.

Figure 17:
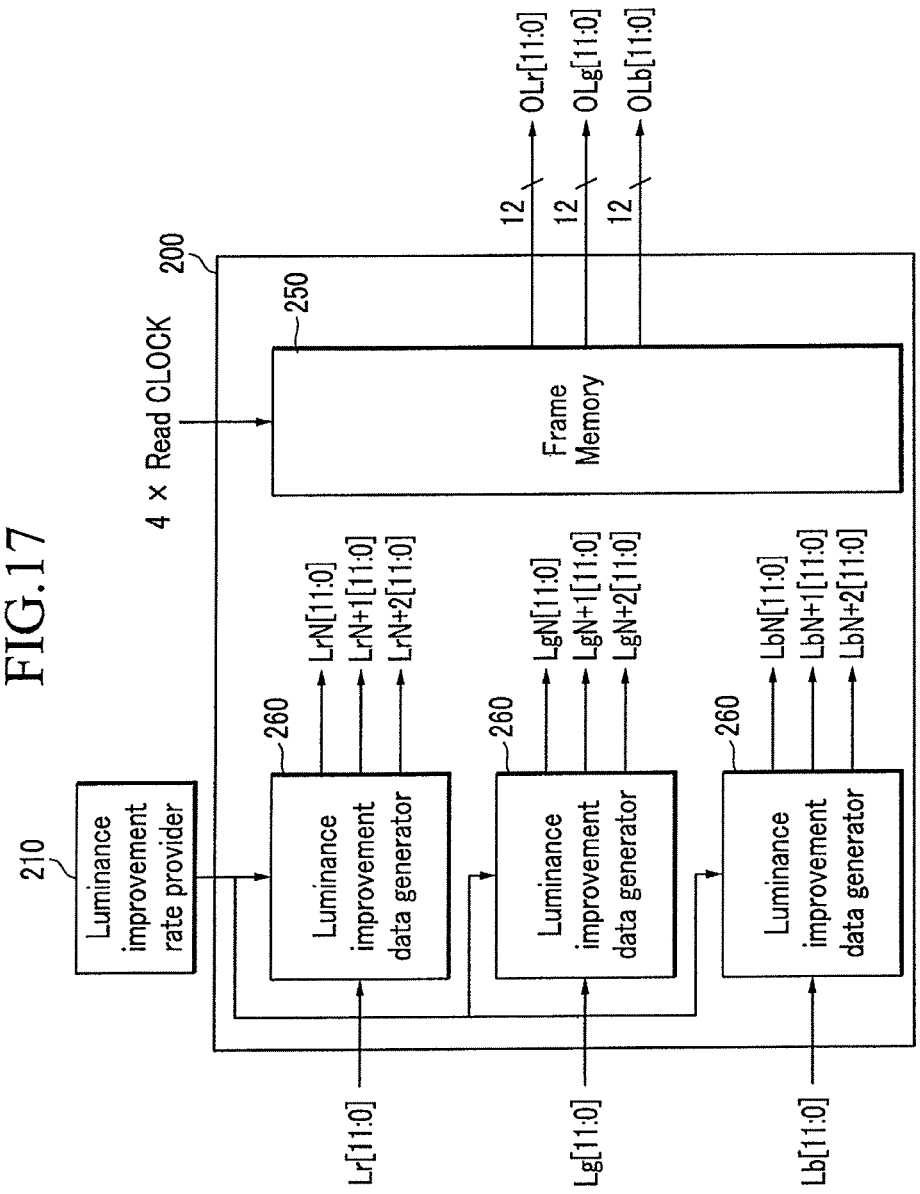

The luminance of the image data gamma-converted through such a method is improved in the luminance improver 200, which will be discussed below with reference to FIGS. 17 to 19. FIG. 17 illustrates the luminance improver 200 according to the exemplary embodiment of the present invention.

Gamma-converted image data Lr, Lg, and Lb corresponding to red, green, and blue are input into a luminance improvement data generator 260 to generate display luminance data LrN, LrN+1, and LrN+2 for three frames among four frames in which the left-eye image (alternatively, right-eye image) and a black image are displayed. In an exemplary embodiment, since displaying the black image is determined in the N+3 frame, only luminance data up to the N+2 frame is calculated, but even luminance data of the N+3 frame may be generated in some exemplary embodiments.

As such, luminance data (including black data of the N+3 frame) generated with respect to four frames are stored in a frame memory 250 with respect to red, green, and blue. The frame memory 250 operates in accordance with a dock of 4× speed to store all luminance data output from the luminance improvement data generator 260 and output it as output data OL. While FIG. 17 illustrates a clock of a 4× speed, embodiments of the present invention are not limited to any particular clock speed. In FIG. 17, r, g, and b represent red, green, and blue, respectively.

Figure 18:
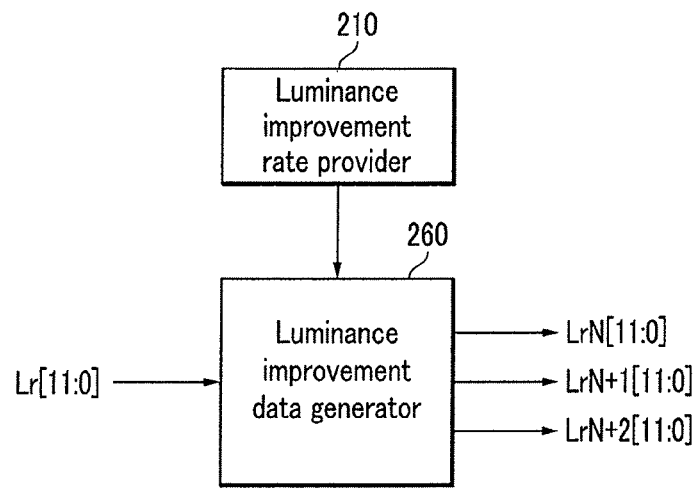
Figure 19:
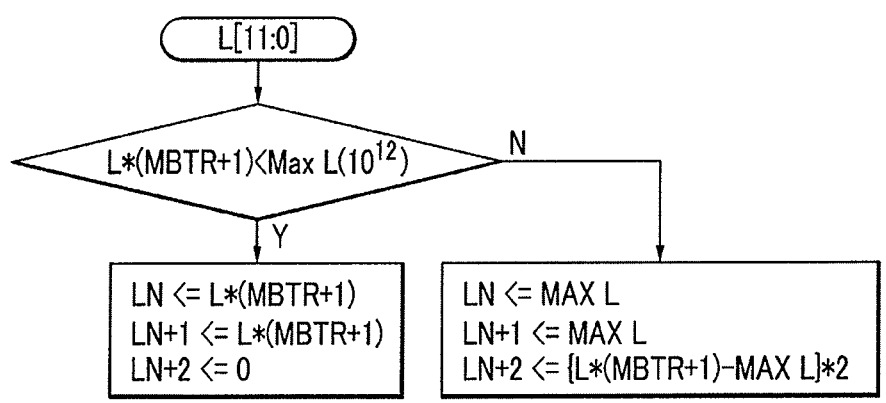

In FIGS. 18 and 19, the method of generating the luminance data with respect to four frames in the luminance improvement data generator 260 is shown in more detail.

FIG. 18 is a diagram primarily showing the luminance improvement data generator 260 for red in FIG. 17. The luminance data of each frame is generated by a method of FIG. 19 based on a luminance improvement rate (MBTR) provided from the luminance improvement rate provider 210.

Whether one group of luminances or another group of luminances is to be applied to the frames is established by Equation 1 as follows:

$$L*(MBTR+1)<MDL \qquad [\text{Equation 1}]$$

where L represents the luminance data input into the luminance improvement data generator 260, MBTR represents the max boost up threshold rate, and MDL represents a maximum displayable luminance.

For example, by using Equation 1, it can be determined whether the sum of the luminance represented by the input luminance data and luminance improved as high as the max boost up threshold rate is smaller than the maximum displayable luminance.

If the result is true (Y), the luminance data of four frames is determined on the basis of Equation 2 shown below.

$$LN<=L*(MBTR+1)$$

$$LN+1<=L*(MBTR+1)$$

$$LN+2<=0 \qquad [\text{Equation 2}]$$

However, if the result is false (N), the luminance data of four frames is determined on the basis of Equation 3 below, $$LN<=MDL.$$

$$LN+1<=MDL$$

$$LN+2<=\{L*(MBTR+1)-\text{MAX } L\}*2 \qquad [\text{Equation 3}]$$

In Equation 2 and Equation 3, LN, LN+1, and LN+2 represent the luminance data of the N frame, the luminance data of the N+1 frame, and the luminance data of the N+2 frame, respectively and since the luminance data of the N+3 frame is the black data, it is not shown through the equations.

The luminance data of four frames generated as above are stored in the memory frame 250 of FIG. 17 and thereafter, output. The output data are input into the reverse gamma converter 300.

Figure 20:
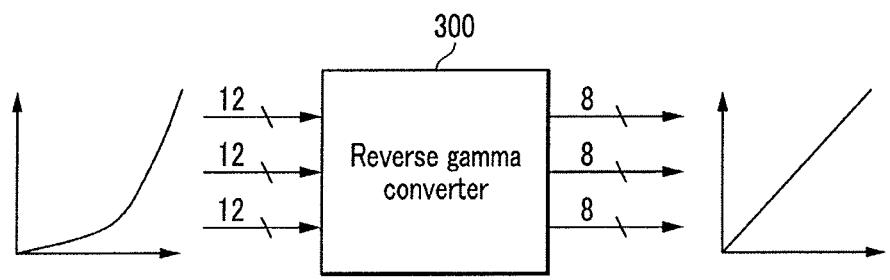

FIG. 20 illustrates an exemplary embodiment of the reverse gamma converter 300. In FIG. 20, 12-bit data is converted into 8-bit data by performing the process in a reverse order to the process of FIG. 15. For example, 12-bit luminance data based on the gamma curve is converted into 8-bit linear data. A reverse gamma conversion may also be performed by a lookup table (not shown) in some exemplary embodiments. As discussed above, the data is not limited to any particular bit size as the data input to the reverse gamma converter 300 could be less or greater than 12 bits. Similarly, the data output by the converter 300 could be less than or greater than 8 bits. The converted 8-bit data is applied to each pixel as a data voltage through a data driver (not shown) to display the improved luminance.

The 3D image display device according to an exemplary embodiment should have improved luminance as shown in FIG. 21. FIG. 21 is a graph showing the improved luminance of the 3D image display device according to an exemplary embodiment of the present invention.

In FIG. 21, 50% is applied as the luminance improvement rate (MBTR), and as a result, the luminance depending on the gray increases in the direction of the arrow. In particular, a section X of the improved luminance curve from a gray corresponding to luminance of 100 to a gray having luminance higher than 100 corresponds to an improved luminance amount acquired by improving the luminance according to the present invention. Since this part in the luminance curve corresponds to an embodiment of the luminance which is larger than the maximum luminance that can be displayed in the N frame and the N+1 frame, it corresponds to a luminance improvement amount acquired while displaying a luminance other than black in the N+2 frame.

The balance rate provider 220 provides a balance rate for determining that a higher additional luminance will be applied to any frame (see FIG. 13B) or the same additional luminance is separately applied to all the frames (see FIG. 13C) in an example of separately adding the luminance to two or more frames as shown in FIGS. 13B and 13C at the time of providing the additional luminance.

The luminance improvement rate provider 210 and the balance rate provider 220 store a plurality of determined values depending on display characteristics and may provide an appropriate rate to the luminance improver 200 or allow adjustment of the rate in accordance with a user's selection.

The 3D image processor 1000 may be provided in a signal controller controlling the display panel or provided as an additional external circuit in some exemplary embodiments.

Having described exemplary embodiments of the invention, it is to be understood that the invention is not limited to the disclosed embodiments, but, on the contrary, is intended to cover various modifications and equivalent arrangements included within the spirit and scope of the disclosure.

What is claimed is:

1. A 3D image display device, comprising:
a display device including a plurality of pixels and displaying each of a left-eye image and a right-eye image,
wherein the display device inserts a black image between the left-eye image and the right-eye image such that the left-eye image is displayed for part of four frames and the black image is displayed for the remaining frames and the right-eye image is displayed for part of four other frames and the black image is displayed for the remaining other frames,
wherein data representing an additional luminance is additionally applied to at least one of the left-eye image, the right-eye image, and the black image to display an image,
wherein the 3D image display device further comprises a 3D image processor adding the data representing the additional luminance to image data for application to a frame,
wherein the 3D image processor comprises:
a gamma converter generating gamma-converted data from image data;
a luminance improver improving the luminance of the gamma-converted data; and
a luminance improvement rate provider,
wherein the luminance improver comprises a luminance improvement data generator generating data having improved luminance depending on a luminance improvement rate provided from the luminance improvement rate provider,
wherein the luminance improvement data generator generates data corresponding to a total of four frames through Equation 2 if a result of Equation 1 is true, and generates data corresponding to the total four frames through Equation 3 if the result is false:

$$L*(MBTR+1)<MDL \quad \text{[Equation 1]}$$

$$LN<=L*(MBTR+1)$$

$$LN+1<=L*(MBTR+1)$$

$$LN+2<=0 \quad \text{[Equation 2]}$$

$$LN<=MDL$$

$$LN+1<=MDL$$

$$LN+2<=\{L*(MBTR+1)-MDL\}*2, \quad \text{[Equation 3]}$$

wherein L represents luminance data inputted into the luminance improvement data generator, MBTR represents a max boost up threshold rate, MDL represents a maximum displayable luminance, and LN, LN+1, and LN+2 represent luminance data of an N frame, luminance data of an N+1 frame, and luminance data of an N+2 frame, respectively.

2. The device of claim 1, further comprising glasses comprising a left lens and a right lens, wherein both the right lens and the left lens are in an off state while the left-eye image and the right-eye image are overlapped with each other in the display device.

3. The device of claim 1, wherein the 3D image processor further comprises:
a reverse gamma converter reverse gamma converting the data having the improved luminance.

4. The device of claim 3, wherein the gamma converter generates output data having a bit number higher than the data input thereto, and wherein the output data is generated by a lookup table.

5. The device of claim 3,
wherein the luminance improver further includes a frame memory storing the data generated by the luminance improvement data generator.

6. The device of claim 3, wherein the reverse gamma converter generates output data having a bit number less than the data input thereto.

7. The device of claim 3, wherein the 3D image processor further includes a balance rate provider, and
  wherein the balance rate provider provides a rate for determining which of two frames data representing an additional luminance is to be more greatly added to when additional luminances are to be applied to the images of both first frame and second frames.

8. The device of claim 7, wherein the balance rate is applied to the luminance improver and considered when data corresponding to a total four frames are generated in the luminance improver.

* * * * *